US 12,260,605 B2

(12) United States Patent
Chen et al.

(10) Patent No.: US 12,260,605 B2
(45) Date of Patent: Mar. 25, 2025

(54) DEVICE AND A METHOD FOR MERGING CANDIDATE AREAS

(71) Applicant: Axis AB, Lund (SE)

(72) Inventors: Jiandan Chen, Lund (SE); Hanna Björgvinsdóttir, Lund (SE); Ludvig Pettersson, Lund (SE)

(73) Assignee: Axis AB, Lund (SE)

( * ) Notice: Subject to any disclaimer, the term of this patent is extended or adjusted under 35 U.S.C. 154(b) by 593 days.

(21) Appl. No.: 17/717,233

(22) Filed: Apr. 11, 2022

(65) Prior Publication Data

US 2022/0351485 A1 Nov. 3, 2022

(30) Foreign Application Priority Data

Apr. 29, 2021 (EP) .................... 21171173

(51) Int. Cl.
*G06V 10/26* (2022.01)
*G06V 10/25* (2022.01)
(52) U.S. Cl.
CPC ............ *G06V 10/267* (2022.01); *G06V 10/25* (2022.01)
(58) Field of Classification Search
CPC .... G06V 10/267; G06V 10/25; G06T 3/4038; G06T 5/50; G06T 7/136; G06T 7/174; G06T 2207/20221; G06T 2210/12; H04N 5/265; H04N 5/262
See application file for complete search history.

(56) References Cited

U.S. PATENT DOCUMENTS

| 2015/0248591 | A1 | 9/2015 | Shi et al. |
| 2016/0344935 | A1 | 11/2016 | Ardo |
| 2018/0047193 | A1 | 2/2018 | Gao et al. |
| 2019/0172209 | A1* | 6/2019 | Yokoi .................... G06V 10/44 |
| 2021/0350129 | A1* | 11/2021 | Muhrbeck ............ G06V 10/764 |

FOREIGN PATENT DOCUMENTS

CN 111754394 A 10/2020

OTHER PUBLICATIONS

Extended European Search Report dated Oct. 19, 2021 for European Patent Application No. 21171173.4.

(Continued)

*Primary Examiner* — Bobbak Safaipour
(74) *Attorney, Agent, or Firm* — Volpe Koenig

(57) ABSTRACT

A device and method merge a first candidate area relating to a candidate feature in a first image and a second candidate area relating to a candidate feature in a second image. The first and second images have an overlapping region, and at least a portion of the first and second candidate areas are located in the overlapping region. An image overlap size is determined indicating a size of the overlapping region of the first and second images, and a candidate area overlap ratio is determined indicating a ratio of overlap between the first and second candidate areas. A merging threshold is then determined based on the image overlap size, and, on condition that the candidate area overlap ratio is larger than the merging threshold, the first candidate area and the second candidate area are merged, thereby forming a merged candidate area.

20 Claims, 5 Drawing Sheets

(56) References Cited

OTHER PUBLICATIONS

Kim et al., "Detecting regions of interest in dynamic scenes with camera motions," 2012 IEEE Conference on Computer Vision and Pattern Recognition, pp. 1258-1265 (2012).

Bochinski et al., "High-Speed tracking-by-detection without using image information," 2017 14th IEEE International Conference on Advanced Video and Signal Based Surveillance (AVSS), pp. 1-6 (2017).

Rezatofighi et al., "Generalized Intersection Over Union: A Metric and a Loss for Bounding Box Regression," 2019 IEEE/CVF Conference on Computer Vision and Pattern Recognition (CVPR), pp. 658-666 (2019).

Ruan et al., "An Improved Algorithm for Dense Object Detection Based on YOLO," 10.1007/978-3-030-14680-1_65, AISC 905, pp. 592-599 (2020).

* cited by examiner

DEVICE AND A METHOD FOR MERGING CANDIDATE AREAS

FIELD OF INVENTION

The present invention relates to merging candidate areas, and specifically to merging a candidate area relating to a feature in a first image and a second candidate area relating to a feature in a second image.

TECHNICAL BACKGROUND

In some image processing applications candidate areas in the image are identified, wherein the candidate areas relate to features, such as objects, segments of an object or other, in the image. For example, such candidate areas may be candidate bounding boxes relating to object detections in the image, wherein the candidate bounding boxes may have been derived by means of an object detection algorithm, e.g., using neural networks. In other examples, such candidate areas may be candidate polygons or pixel masks derived by means of an instance segmentation algorithm, or pixel masks derived from a motion detection algorithm. Once candidate areas in the image have been identified, merging algorithms may be performed in order to determine whether or not two candidate areas should be merged into a single candidate area. Such determining is typically based on threshold for a ratio of overlap between the two candidate areas, i.e., how much do the candidate areas overlap in relation to their total sizes. For a ratio of overlap over the threshold, the candidate areas are merged, and for a ratio of overlap below the threshold, the candidate areas are not merged. The aim of such merging algorithms is that determining to merge two candidate areas should correspond to cases where the two candidate areas in fact relate to the same feature in the image. Such merging algorithms have been developed for scenarios when the candidate areas have been identified in a single continuous image. However, there are scenarios when such algorithms are not successful in identifying all relevant situations when the candidate areas should be merged, i.e., when the candidate areas in fact relate to the same feature in the image. One example of such a scenario is when the candidate areas have been identified in a discontinuous image captured by a single image sensor, wherein two portions (handled as two separate images when identifying candidate areas) of the discontinuous image have an overlapping region, which in this case is a region captured by a same region of the single image sensor. Another example of such a scenario is when the candidate areas have been identified in two separate images captured by two separate image sensors, wherein the two images include an overlapping region, which in this case is a region representing a portion of a scene captured by both of the two separate image sensors.

SUMMARY

Facilitating enhanced identification and merging of two candidate areas in relation to two respective images, where in the two respective images have an overlapping region, would be beneficial.

According to a first aspect, a method for merging a first candidate area relating to a candidate feature in a first image and a second candidate area relating to a candidate feature in a second image is provided. The first image and the second image have an overlapping region, and at least a portion of the first candidate area and at least a portion of the second candidate area are located in the overlapping region. The method comprises determining an image overlap size indicating a size of the overlapping region of the first image and the second image; determining a candidate area overlap ratio indicating a ratio of overlap between the first candidate area and the second candidate area; determining a merging threshold based on the image overlap size; and on condition that the candidate area overlap ratio is larger than the merging threshold, merging the first candidate area and the second candidate area, thereby forming a merged candidate area.

By "candidate feature" is meant an object, part of an object, segment of an object, a portion where there is a movement or any other feature of an image for which a candidate area has been identified in preceding processing and being input to the method according to the first aspect.

By "image" in relation to a first image and a second image is meant that the first image and the second image have been handled separately when identifying candidate areas. The first image and the second image may have been captured by a respective one of a first image sensor and a second image sensor. In alternative, the first image and the second image may be a first portion and a second portion, respectively, of an image captured using a single image sensor. In the latter case, the first image and the second image may be transformations of the first portion and the second portion, respectively.

By "overlapping region" in relation to the first and second images having an overlapping region is meant that there is a region in one image of the first and second images that is included also in the other image with or without transformation, or that there is a region in one image of the first and second images that is a representation of a same portion of a scene as a region in the other image. In the former case, the first and second images may for example be transformations of portions of a wide-angle view of a scene in order to reduce distortions of feature size relations. In the latter case, the first and second images may be images captured by first and second image sensors, respectively, wherein the first and second image sensors capture respective but partially overlapping portions of the scene.

By "ratio" in relation to the ratio of overlap between the first candidate area and the second candidate area is meant any kind of normalization in relation to sizes of the first and second candidate areas.

For a first candidate area identified in a first image and a second candidate area identified in a second image, wherein the first image and the second image have an overlapping region, the overlap between the first candidate area and the second candidate area is limited in size by the size of the overlapping region. For a candidate feature of which a portion is in the first image and a portion is in the second image there will be a common portion of the candidate feature that will be in the overlapping region, i.e., that common portion will appear in both the first image and in the second image. As a first candidate area relating to the candidate feature identified in the first image and a second candidate area relating to the candidate feature identified in the second image can only overlap in the overlapping region. To accommodate for this limitation, the merge threshold is according to the first aspect is determined based on the size of the overlapping region.

By determining the merging threshold based on the image overlap size the risk of not merging the first candidate area and the second candidate area even when they relate to the same candidate feature is reduced. Hence, the risk is reduced that the same candidate feature in the two separate images risk be identified as two separate candidate features.

The merging threshold may be determined to be increasing with the image overlap size. For example, the merging threshold may be determined to be proportional to the image overlap size. Hence, for a given overlap size, the merging threshold will be determined to be the given overlap size multiplied with a proportionality constant.

The candidate area overlap ratio may be determined as an intersection of the first candidate area and the second candidate area divided by the union of the first candidate area and the second candidate area. This measure of the candidate area overlap ration is commonly referred to as Intersection over Union (IoU).

The first candidate area and the second candidate area may be identified in coordinates of a combined image comprising the first image and the second image. This may for example relate to a case where the first image and the second image have been captured by a first image sensor and a second image sensor, respectively, wherein the first image sensor and the second image sensors capture respective but partially overlapping portions of a scene.

The first image may be a first transformed view of a first portion of a fisheye image and the second image may be a second transformed view of a second portion of the fisheye image, and the first candidate area and the second candidate area may be identified in coordinates of the fisheye image or in coordinates of some other coordinate system. This relates to a case where the first image and the second image are a first portion and a second portion, respectively, of an image captured using a single image sensor and wherein, the first image and the second image are transformations of the first portion and the second portion, respectively. Hence, the first candidate area and the second candidate area having been identified in the first image and the second image, respectively, have been transformed back such that they are identified in the coordinates of the fisheye image or in coordinates of some other coordinate system.

The merged candidate area may consist of the union of the first candidate area and the second candidate area. Alternatives are envisaged. If, for example, the merged candidate area should have a particular shape, the merged candidate area may be an area of the particular shape comprising the first candidate area and the second candidate area. For example, the merged candidate area may be the smallest area of the particular shape comprising the first candidate area and the second candidate area.

The first and second candidate areas may be one of bounding boxes, pixel masks, and polygon areas. The merged candidate area may then be of a same type. For example, if the first and second candidate areas are bounding boxes, the merged candidate area may also be a bounding box.

According to a second aspect, a non-transitory computer-readable storage medium is provided having stored thereon instructions for implementing the method according to the first aspect, when executed by a device having processing capabilities.

The above-mentioned optional additional features of the method according to the first aspect, when applicable, apply to this second aspect as well. In order to avoid undue repetition, reference is made to the above.

According to a third aspect, a device for merging a first candidate area relating to a candidate feature in a first image and a second candidate area relating to a candidate feature in a second image is provided. The first image and the second image have an overlapping region, and at least a portion of the first candidate area and at least a portion of the second candidate area are located in the overlapping region. The device comprises circuitry configured to execute an image overlap size determining function configured to determine an image overlap size indicating a size of the overlapping region of the first image and the second image; a candidate area overlap ratio determining function configured to determine a candidate area overlap ratio indicating an overlap between the first candidate area and the second candidate area; a merging threshold determining function configured to determine a merging threshold based on the image overlap size; and a merging function configured to, on condition that the candidate area overlap ratio is larger than the merging threshold, merge the first candidate area and the second candidate area, thereby forming a merged candidate area.

The above-mentioned optional additional features of the method according to the first aspect, when applicable, apply to this third aspect as well. In order to avoid undue repetition, reference is made to the above.

A further scope of applicability will become apparent from the detailed description given below. However, it should be understood that the detailed description and specific examples, while indicating preferred, are given by way of illustration only, since various changes and modifications within the scope of the claims will become apparent to those skilled in the art from this detailed description.

Hence, it is to be understood that is the concepts are not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting but are instead used for explaining and understanding.

DETAILED DESCRIPTION

Figure 1A:
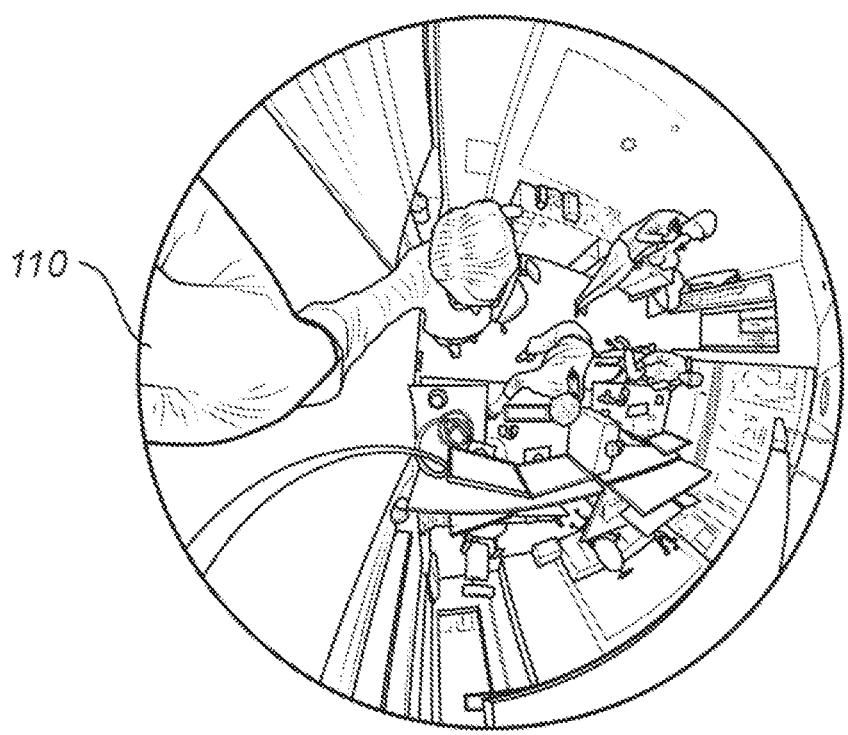
FIG. 1A shows a panoramic image captured using a fisheye lens and a single image sensor.

The concepts will now be described hereinafter with reference to the accompanying drawings, in which currently preferred embodiments are illustrated. These concepts may, however, be embodied in many different forms and should not be construed as limited to the embodiments set forth herein.

In the following, when referring to a candidate feature, such a candidate feature may relate to an object, a part of an object, a segment of an object, a portion where there is a movement or any other feature of an image in relation to which a candidate area has been identified in a preceding processing, such as object detection, instance segmentation, panoptic segmentation, or motion based task to find where in an image there is movement.

Furthermore, in the following, when referring to images, such images may have been captured by a respective one of image sensors or may relate to portions of a single image captured using a single image sensor. In the latter case, the images may be transformations of the portions of the single image.

Furthermore, in the following, when referring to an overlapping region or an overlap in relation to two images, such an overlapping region or an overlap is a region of one image of the two images that is included also in an the other image of the two images with or without transformation, or a region in one image of the two images that is a representation of a same portion of a scene as a region in the other image of the two images. In the former case, the two images may for example be transformations of portions of a wide-angle view of a scene in order to reduce distortions of feature size relations. In the latter case, the first and second images may be images captured by first and second image sensors, respectively, wherein the first and second image sensors capture respective but partially overlapping portions of the scene.

The concepts herein are applicable when processing has been performed separately in relation to a first image and a second image in order to identify candidate areas relating to a candidate feature in the first image and a candidate feature in the second image, respectively. For example, the processing may relate to object detection wherein the candidate feature to which each candidate area relates is an object. Such object detection may use a one-stage neural network such as a You Only Look Once (YOLO) architecture, Single Shot MultiBox Detector (SSD)/SSD-Lite, anchor free architectures such as CenterNet or Fully Convolutional One-Stage object detection (FCOS), and transformer-based networks such as DEtection TRansformer (DETR). The object detection may further relate to two/multiple-stage detectors such as Region Based Convolutional Neural Network (R-CNN), Faster R-CNN, etc. The object detection may further be Histogram of Oriented Gradients (HOG) based. For object detection output candidate areas may be boxes or other type of polygons. The processing may further relate to segmentation, such as instance segmentation (e.g., Mask R-CNN), and panoptic segmentation, wherein the candidate feature to which each candidate area relates is a segment. For segmentation output candidate areas may be polygons or pixel masks. The processing may further relate to motion-based tasks where the task is to find where in an image there is movement, wherein the candidate feature to which each candidate area relates is a portion in where there is movement. Output candidate areas from motion-based tasks may be polygons or pixel masks.

When the above described or other processing has been performed, candidate features located partly in the overlapping region will typically result in candidate areas in both of the first image and the second image. However, since the overlap between candidate areas in different images is limited by the size of the overlap, using a same merging threshold as when merging candidate areas in the same image, will in some cases result in not merging the candidate boxes even though the candidate areas do relate to the same candidate feature.

The concepts relate to determining when to merge candidate areas. To this end, Non-Maximum Suppression (NMS) is often applied. For example, most object detection approaches apply a sliding window over a feature map and assigns foreground/background confidence values (scores) depending of the candidate features computed in that window. In some deep learning detectors, such as single shot multibox detector, faster RCNN detector, uses pre-defined anchor boxes in different resolution of feature layers. The neighbourhood windows (anchor boxes) have similar confidence values to some extent and are considered as candidate areas. This leads to many candidate areas for a same candidate object (candidate feature). The NMS is used to filter the proposals based on Intersection over Union (IoU), which can be defined as the intersection of two candidate areas divided by the union of the two candidate areas.

Each candidate area is compared with all the other candidate areas by calculating the IoU of this candidate area with every other candidate area. If the IoU is greater than a merging threshold N, then the candidate areas are merged. One typical merge method is to select the proposal with highest confidence value.

Figure 1B:
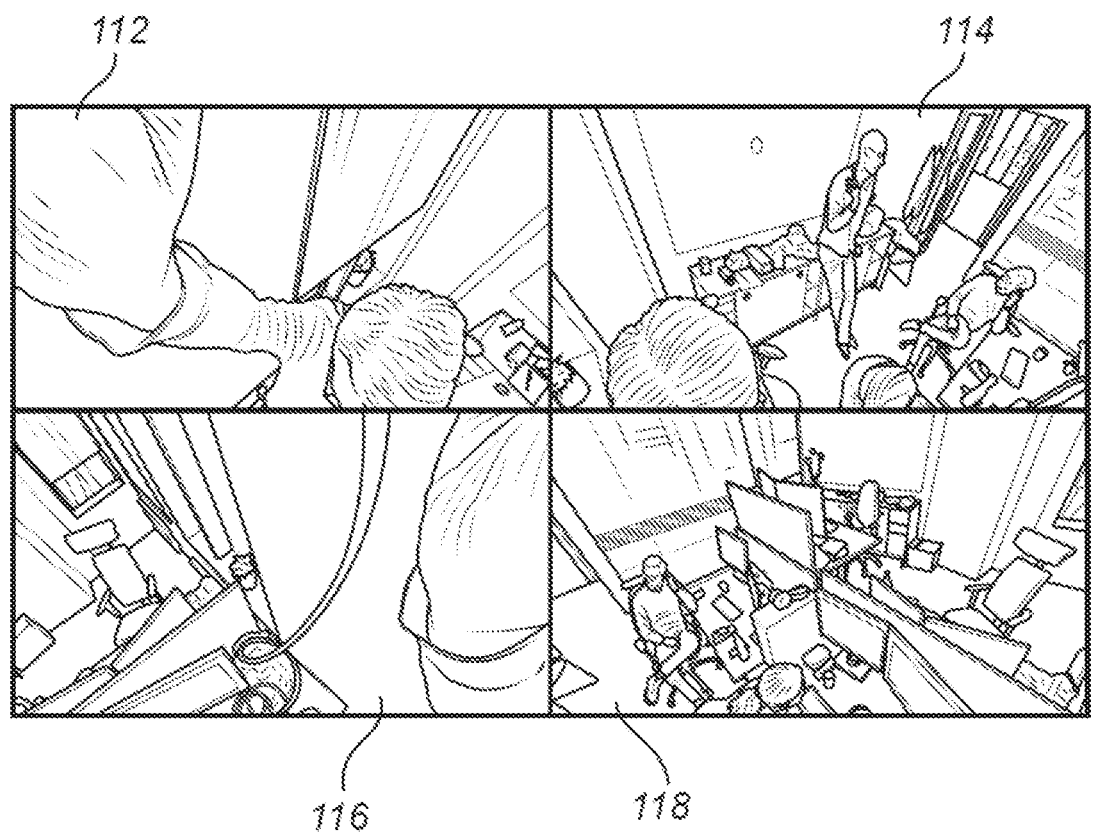
FIG. 1B shows a so called quadview of the image of FIG. 1A including four transformed views of a respective one of four portions of the image of FIG. 1A.
Figure 1C:
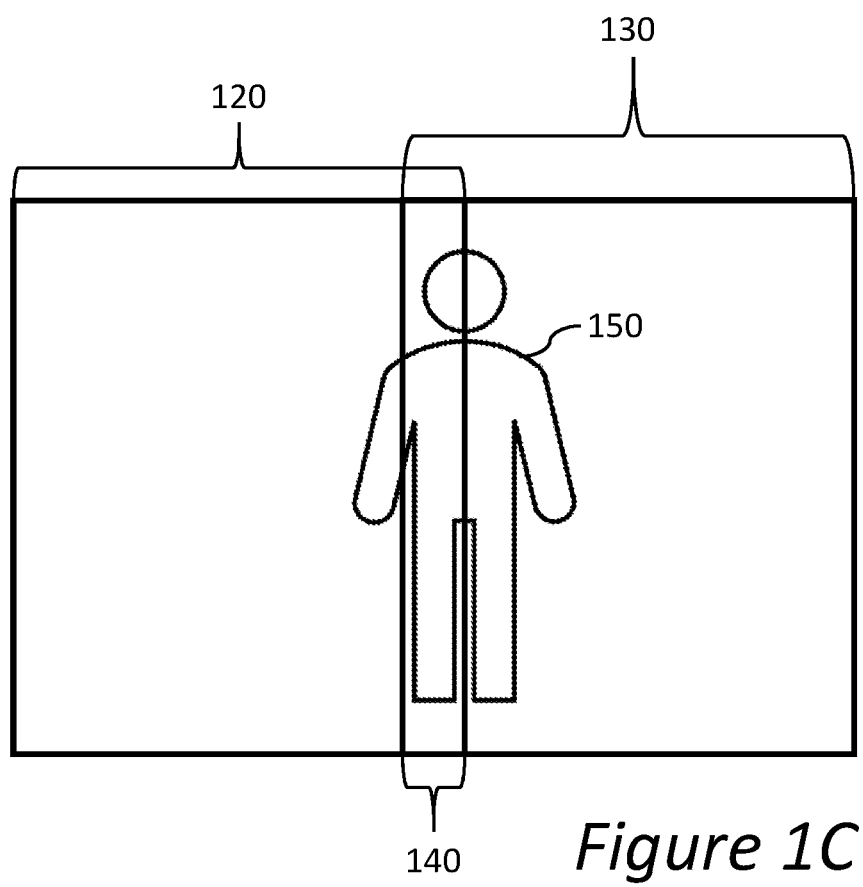
FIG. 1C shows a schematic illustration of two images having an overlap.

In the following a first scenario will be described in relation to FIG. 1A showing a panoramic image 110 captured using a fisheye lens, FIG. 1B showing a so called quadview of the image of FIG. 1A including four transformed views (images) 112, 114, 116, 118 of a respective one of four portions of the image 110a of FIG. 1A, and FIG. 1C showing a schematic illustration of two images 120, 130 having an overlapping region 140.

As can be seen from FIG. 1A, the use of a fisheye lens will provide a wide angle view 110 but the view will be distorted such that a relative size of a feature in the image will depend on the location in the view. When processing an image 110 as disclosed in FIG. 1A in order to identify candidate areas in relation to candidate features in the image, some features may become relatively small due to the distortion and processing of the image may result in errors in relation to such relatively small features. Hence, instead of processing the image 110 as shown in FIG. 1A, the image may be divided into portions, such as four portions. Furthermore, in order to reduce the distortion, each portion may be transformed into what could be designated a part of a discontinuous image or a separate image, such as the first to fourth images (parts) 112, 114, 116, 118 in the quadview of FIG. 1B, such that the relative size of a feature is less dependent on its location in one of the images 112, 114, 116, 118. Processing the images 112, 114, 116, 118 separately will provide candidate areas in relation to candidate features in the respective image of the images 112, 114, 116, 118. Furthermore, the image 110 in FIG. 1A is divided into portions and the portions are transformed into separate images such that the distortion is reduced and such that each image of the images 112, 114, 116, 118 will include regions that is included also in other images of the images 112, 114, 116, 118. As indicated hereinabove, a region that is included in two images of the images 112, 114, 116, 118 is referred to as an overlapping region of the two images. A schematic illustration of a first image 120 and a second image 130 having an overlapping region 140 is shown in FIG. 1C. The first image 120 and the second image 130 of FIG. 1C may correspond to pairs of images in FIG. 1B, such as the first image 112 and the second image 114, the first image 112 and the third image 116, the second image 114 and the fourth image 118, and the third image 116 and the fourth image 118. It is to be noted that FIG. 1C only provides a schematic illustration of how a feature 150 in the form of an object may have a first portion that is located only in the first image 120, a second portion that is located only in the second image 130 and a third portion that is located in the overlapping region 140 which means that it is located both in the first image 120 and in the second image 130. For example, the overlapping region 140 between the first image 120 and the second image 130 in FIG. 1C is rectangular. In the actual case, an overlapping region of two images of the four images 112, 114, 116, 118 of the quadview of FIG. 1B would typically not be rectangular. However, the respective overlapping region of images of the four images 112, 114, 116, 118 of the quadview of FIG. 1B can be determined based on knowledge of how the four images 112, 114, 116, 118 of the quadview of FIG. 1B were created from the image 110 of FIG. 1A, such as the respective portion of the image 110 of FIG. 1A used for each image of the four images 112, 114, 116, 118 of the quadview of FIG. 1B and the transformation used etc.

In order to ensure proper processing to identify candidate areas, division of an original image into portions and transformation of the portions into separate images, should preferably be configured such that there is no region of the original image that is not shown in any one of the separate images. This is not the case in relation to the original image 110 in FIG. 1A and the separate images 112, 114, 116, 118 in FIG. 1B.

It is to be noted, that the quadview of FIG. 1B may also be created and used for other reasons, such as in order to provide a better overview of the scene when one or more images or a video of the scene is viewed.

In the following a second scenario will be described in relation to FIG. 1C showing a schematic illustration of two images having an overlap. As alternative of using a wide angle lens, such as a fisheye lens, a panoramic image covering a wide angle can be produced by using two image sensors. In the second scenario, the first image 120 would be an image captured by a first image sensor and the second image 130 would be an image captured by a second image sensor. The overlapping region 140 would be a region captured by both by the first image sensor and by the second image sensor. In contrast to the first scenario, the overlapping region would hence not relate to a region in both the first image and the second image captured by the same image sensor and, hence, not include identical image data. Instead, it would include image data from the respective image sensor of the first image sensor and the second image sensor representing a same portion of the scene captured by the first image sensor and the second image sensor. In this second scenario, the first image 120 and the second image 130 may later be stitched together to form a single combined image showing a representation of the scene captured by the first image sensor and the second image sensor. However, in this second scenario also, when processing to identify candidate areas, e.g., using one of the types of processing as described hereinabove, it may be advantageous to process the first image 120 and the second image 130 separately. For example, the first image sensor and the second image sensor may be co-located or otherwise related to a respective one of two processing units and thus, the processing of the first image 120 and the second image 130 may be performed in parallel to provide resulting candidate areas from the processing within shorter time. Also, by processing the first image 120 and the second image 130 separately, will result in processing two smaller images which will enable identification of smaller candidate areas, e.g., by enabling detection of smaller objects. There may also be hardware restrictions preventing processing of a combination of the first image 120 and the second image 130 as a combined image.

Figure 2A:
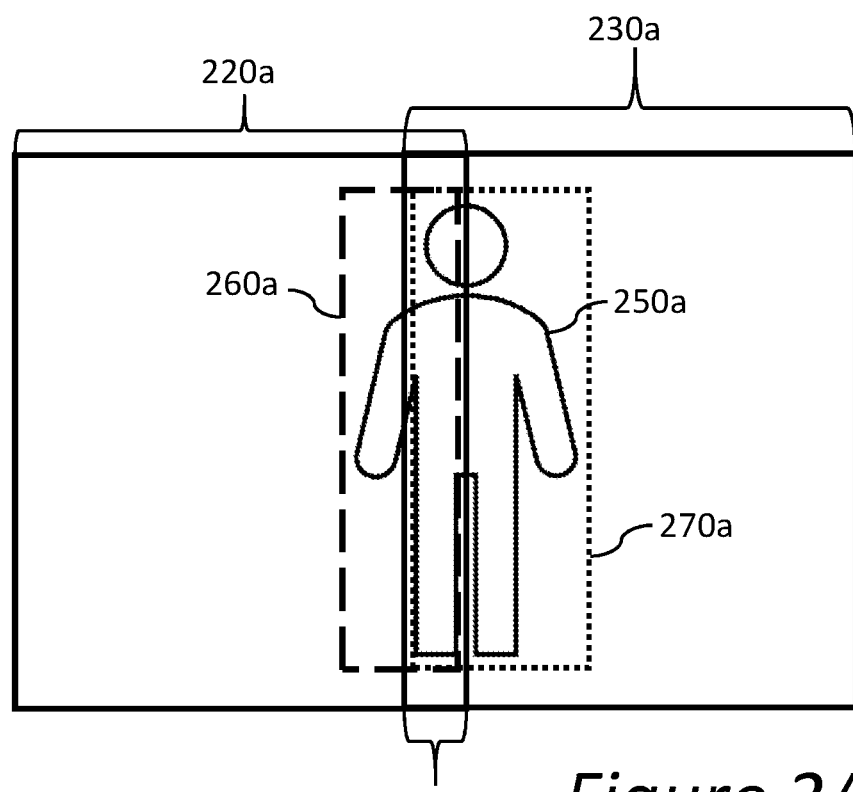
FIG. 2A shows an illustration of a first image and a second image and a first candidate area and a second candidate area in relation to a candidate feature in the first image and the second image, respectively.
Figure 2B:
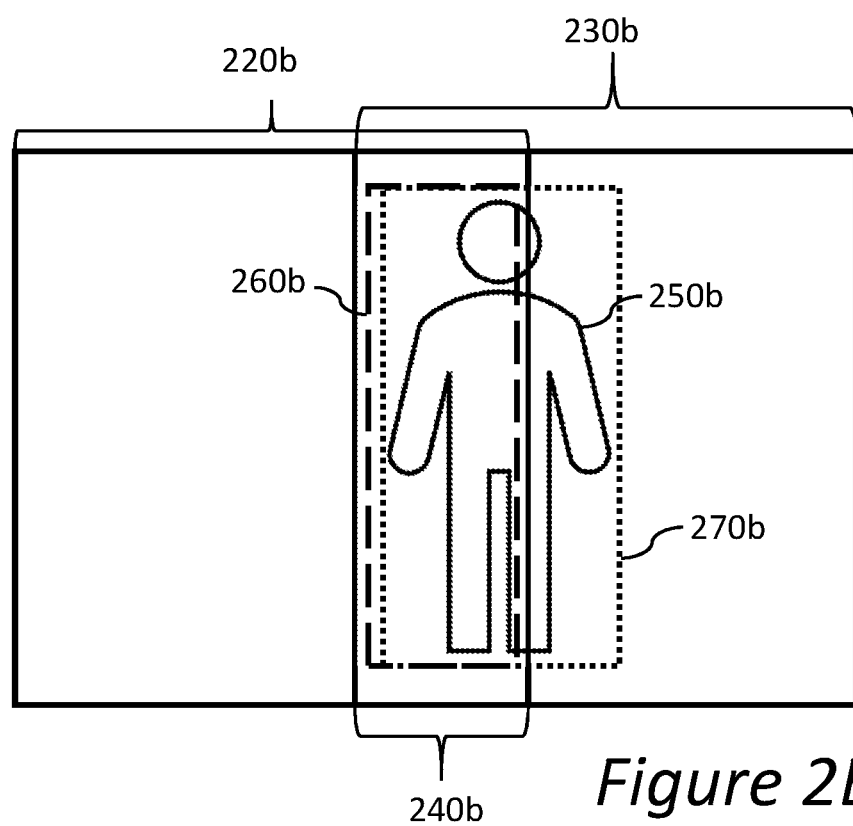
FIG. 2B shows a further illustration of a first image and a second image and a first candidate area and a second candidate area in relation to a candidate feature in the first image and the second image, respectively.

In the different scenarios and in different specific implementations, an overlapping region between two images may be of different sizes as reflected in FIG. 2A and FIG. 2B. FIG. 2A shows an illustration of a first image 220*a* and a second image 230*a* having an overlapping area 240*a*. Furthermore, in FIG. 2A, a first candidate area 260*a* in the form of a bounding box is shown in a dashed line and a second candidate area 270*a* in the form of a bounding box is shown in a dotted line in relation to a candidate feature 250*a* in the form of an object in the first image 220*a* and the second image 230*a*, respectively. FIG. 2B shows a further illustration of a first image 220*b* and a second image 230*b* having an overlapping area 240*b*. Furthermore, in FIG. 2B a first candidate area 260*b* in the form of a bounding box is shown in a dashed line and a second candidate area 270*b* in the form of a bounding box is shown in a dotted line in relation to a candidate feature 250*b* in the form of an object in the first image 220*b* and the second image 230*b*, respectively. As can be seen from the illustrations of FIG. 2A and FIG. 2B, the overlapping region 240*a* of the first image 220*a* and the second image 230*a* in FIG. 2A is smaller than an overlapping region 240*b* of the first image 220*b* and the second image 230*b* in FIG. 2B. Furthermore, a size of an intersection between a candidate area in one of the images and a candidate area in the other if the images is limited by the size of the overlapping region, the size of the intersection between candidate areas for a feature of which at least a portion is located in an overlapping region will depend on the size of the overlapping region. As can be seen from the illustrations of FIG. 2A and FIG. 2B, the intersection between the candidate area 260*a* in the first image 220*a* and the candidate area 270*a* in the second image 230*a* of FIG. 2A is smaller than the intersection between the candidate area 260*b* in the first image 220*b* and the candidate area 270*b* in the second image 230*b* of FIG. 2B since the overlapping region 240*a* in FIG. 2A is smaller than the overlapping region in FIG. 2B. On the other hand, a size of a union between a candidate area in one of the images and a candidate area in the other of the images is generally not significantly affected by the size of the overlapping region but rather depends on the size of a feature to which they relate in the case the candidate areas in the images in fact relate to a same feature of which at least a portion is located in the overlapping region.

FIG. 2A and FIG. 2B each discloses two candidate areas in the form of rectangular bounding boxes, which candidate areas each have a portion in the overlapping region. The merging of candidate areas of the present disclosure is applicable mutatis mutandis for candidate areas of other types and shapes, such as pixel masks and polygon shaped as described hereinabove. Furthermore, the two candidate areas in FIG. 2A and FIG. 2B relate to a feature in the form of an object. However, the merging of candidate areas of the present disclosure is applicable mutatis mutandis for candidate areas relating to features of other types and being the result of other types of processing, such as segments resulting from segmentation of different types as described hereinabove and portions where there is motion resulting from motion-based tasks as described hereinabove.

Figure 3:
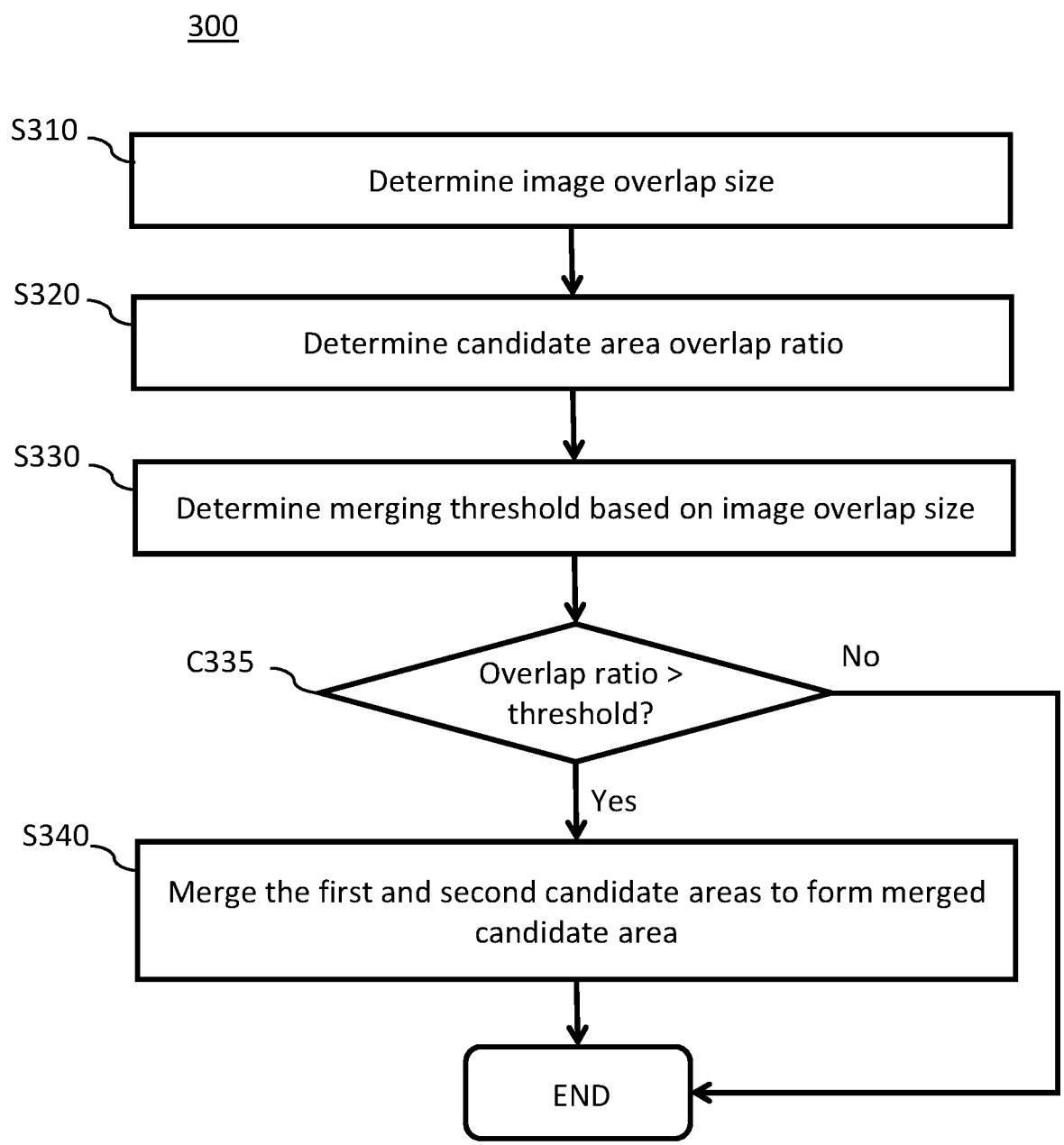
FIG. 3 shows a flow chart in relation to embodiments of a method for merging a first candidate area relating to a candidate feature in a first image and a second candidate area relating to a candidate feature in a second image.

Embodiments of a method 300 for merging a first candidate area 260a, 260b relating to a candidate feature 250, 250a, 250b in a first image 220, 220a, 220b and a second candidate area 270a, 270b relating to a candidate feature 250, 250a, 250b in a second image 230, 230a, 230b will now be described in relation to FIG. 3 showing a flow chart 300 and with reference to FIG. 1A, FIG. 1B, FIG. 1C, FIG. 2A and FIG. 2B. The first image 220, 220a, 220b and the second image 230, 230a, 230b have an overlapping region 240, 240a, 240b, and at least a portion of the first candidate area 260a, 260b and at least a portion of the second candidate area 270a, 270b are located in the overlapping region 240a, 240b.

The first image 220, 220a, 220b and the second image 230, 230a, 230b may relate to any scenario resulting in them to have an overlapping region 240, 240a, 240b.

For example, the first image 220, 220a, 220b may be a first transformed view of a first portion of a fisheye image 110, i.e., a panoramic image 110 captured by means of a fisheye lens, and the second image 230, 230a, 230b may be a second transformed view of a second portion of the fisheye image 110 as described in relation to FIG. 1A and FIG. 1B. The first candidate area 260a, 260b and the second candidate area 270a, 270b may, in this example, be identified in coordinates of the image 110. For example, if candidate areas have been identified based on previous processing to identify candidate features in the first transformed view (image) 112 and in the second transformed view (image) 114 of the quadview in FIG. 1B, the candidate areas may first be transformed to coordinates of the image 110 of FIG. 1A by means of an inverse of the transform used to transform the corresponding portions of the image 110 to the first transformed view (image) 112 and in the second transformed view (image) 114. Hence, even if the first candidate area 260a, 260b relates to a candidate feature 250, 250a, 250b in the first image 220, 220a, 220b and the second candidate area 270a, 270b relates to a candidate feature 250, 250a, 250b in the second image 230, 230a, 230b, this does not necessarily mean that the first candidate area 260a, 260b and the second candidate area 270a, 270b are identified in the coordinates of the first image 220, 220a, 220b and the second image 230, 230a, 230b, respectively. It is to be noted that the first candidate area 260a, 260b and the second candidate area 270a, 270b in FIG. 2A and FIG. 2B are rectangular bounding boxes. However, in the scenario in relation to FIG. 1A and FIG. 1B, such bounding boxes would relate to transformations of rectangular bounding boxes identified in the four transformed views (images) 112, 114, 116, 118 into the coordinates of the image 110.

As another example, the first image 220, 220a, 220b may be an image captured by a first image sensor and the second image 230, 230a, 230b may be an image captured by a second image sensor as disclosed in relation to FIG. 1C. The first candidate area 260a, 260b and the second candidate area 270a, 270b may, in this example, be identified in coordinates of a combined image comprising the first image 220, 220a, 220b and the second image 230, 230a, 230b.

The first candidate area 260a, 260b and the second candidate area 270a, 270b may be any candidate areas resulting from previous processing to identify candidate features in the first image 220, 220a, 220b and the second image 270a, 270b, respectively, such as processing of the types described hereinabove. Depending on scenario, the first candidate area 260a, 260b and the second candidate area 270a, 270b may be transformations of candidate areas identified in the first image 220, 220a, 220b and in the second image 230, 230a, 230b, respectively.

Furthermore, the first candidate area 260a, 260b and the second candidate area 270a, 270b may be candidate areas resulting directly from previous processing to identify candidate features in the first image 220, 220a, 220b and the second image 270a, 270b, with or without transformation depending on scenario. In alternative, the first candidate area 260a, 260b and the second candidate area 270a, 270b may be candidate areas resulting from first merging candidate areas in the respective image separately based on a candidate area merging algorithm, such as NMS as described hereinabove. Hence, for example, the first candidate area 260a, 260b may relate to two or more candidate areas identified in the first image 220, 220a, 220b being merged by means of a merging algorithm applied only to candidate areas in the first image 220, 220a, 220b, i.e., without consideration of any candidate areas identified in the second image 230, 230a, 230b.

The first candidate area 260a, 260b and the second candidate area 270a, 270b may be bounding boxes, pixel masks, or polygon areas as described hereinabove. The shape of the first candidate area 260a, 260b and the second candidate area 270a, 270b depends on the type of processing used to identify them, such as the types of processing described hereinabove. Furthermore, the shape of the first candidate area 260a, 260b and the second candidate area 270a, 270b may also depend on a transformation performed of corresponding candidate areas identified in the first image 220, 220a, 220b and the second image 230, 230a, 230b, respectively, when in the first image 220, 220a, 220b and the second image 230, 230a, 230b are transformed portions of a single image 110.

In the method 300 an image overlap size indicating a size of the overlapping region 240, 240a, 240b of the first image 220, 220a, 220b and the second image 230, 230a, 230b is determined S310. The way the size is determined will typically depend on the shape of the overlapping region. For example, for an overlapping region 240, 240a, 240b, as disclosed in FIG. 1C, FIG. 2A and FIG. 2B, which is rectangular and has a uniform width, the image overlap size may be set to the width of the overlap.

Furthermore, a candidate area overlap ratio indicating a ratio of overlap between the first candidate area 260a, 260b and the second candidate area 270a, 270b is determined S320. Any kind of normalization in relation to sizes of the first candidate area 260a, 260b and the second candidate area 270a, 270b may be used and typically in relation to the size of the union of the first candidate area 260a, 260b and the second candidate area 270a, 270b. For example, the candidate area overlap ratio may be determined as the intersection of the first candidate area 260a, 260b and the second candidate area 270a, 270b divided by the union of the first candidate area 260a, 260b and the second candidate area 270a, 270b.

Then a merging threshold is determined S340 based on the image overlap size. The merging threshold may be determined to be increasing with the image overlap size. For example, the merging threshold may be determined to be proportional to the image overlap size. Hence, for a given overlap size, the merging threshold will be determined to be the given overlap size multiplied with a proportionality constant.

On condition C335 that the candidate area overlap ratio is larger than the merging threshold, the first candidate area 260a, 260b and the second candidate area 270a, 270b are merged S340 to form a merged candidate area. The merged candidate area may consist of the union of the first candidate area 260a, 260b and the second candidate area 270a, 270b.

By determining the merging threshold based on the image overlap size the risk of not merging the first candidate area and the second candidate area even when they relate to the same feature is reduced. Hence, the risk is reduced that the same feature in separate images risk be identified as two separate features.

The method 300 may be adapted to better accommodate different shapes and orientations of features resulting in identification of different shapes and orientation of candidate areas. For example, if a feature is elongated, different orientations of the feature will result in different proportions of the feature and hence different proportions of candidate areas identified will typically be in an overlapping region. For example, in relation to FIG. 2A and FIG. 2B, if the feature 250, 250a, 250b would have been horizontal instead of vertical, a smaller proportion of the feature would have been in the overlapping region 240, 240a, 240b. Hence, to take this into account, a size of the intersection of the overlapping region 240, 240a, 240b and the union of the first candidate area 260a, 260b and the second candidate area 270a, 270b may be determined. The merging threshold may be determined based on the image overlap size by basing the merging threshold on the size of the intersection of the overlapping region 240, 240a, 240b and the union of the first candidate area 260a, 260b and the second candidate area 270a, 270b. For example, the merging threshold may be determined to be proportional to the size of the intersection of the overlapping region 240, 240a, 240b and the union of the first candidate area 260a, 260b and the second candidate area 270a, 270b. Hence, for a given the size of the intersection of the overlapping region 240, 240a, 240b and the union of the first candidate area 260a, 260b and the second candidate area 270a, 270b, the merging threshold will be determined to be the given the size of the intersection of the overlapping region 240, 240a, 240b and the union of the first candidate area 260a, 260b and the second candidate area 270a, 270b multiplied with a proportionality constant. This adaptation is further suitable also when an overlapping region does not have a uniform width.

Even though embodiments of the method 300 have been described in relation to two images, the embodiments of the method are also applicable to cases where there are three or more images. In such a case, embodiments of the method 300 may be applied for the three or more images in one step for all images or recursively, i.e., first for first two images having an overlap, then for the result from the first two images and a further image of the three or more images having an overlap with either of the two first images, and so on.

Figure 4:
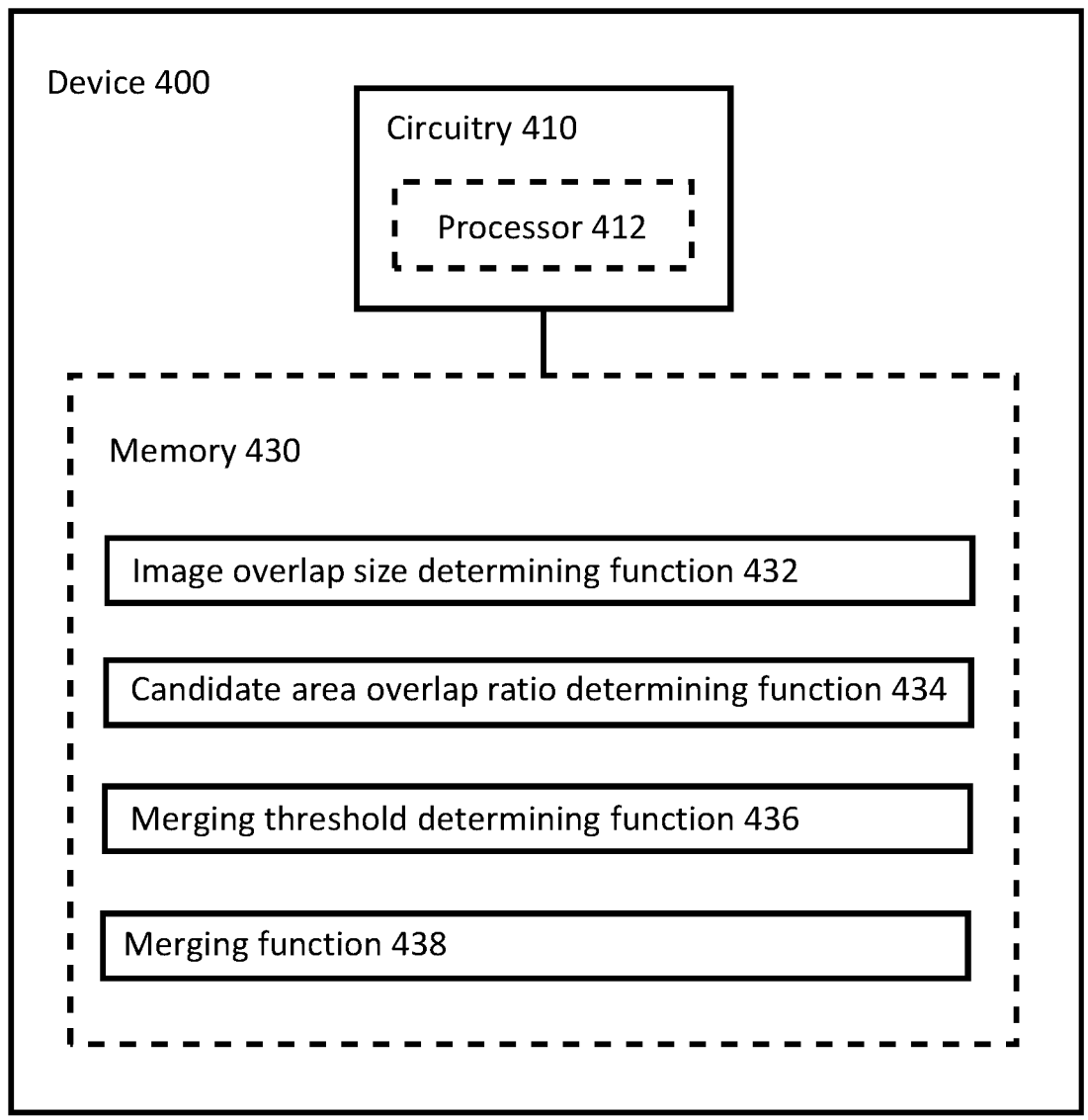
FIG. 4 shows a schematic diagram in relation to embodiments of a device merging a first candidate area relating to a candidate feature in a first image and a second candidate area relating to a candidate feature in a second image.

FIG. 4 shows a schematic diagram in relation to embodiments of a device 400 of the present disclosure for merging a first candidate area relating to a candidate feature in a first image and a second candidate area relating to a candidate feature in a second image, wherein the first image and the second image have an overlapping region, and wherein at least a portion of the first candidate area and at least a portion of the second candidate area are located in the overlapping region. The device 400 may for example be a camera. The device 400 comprises circuitry 410. The circuitry 410 is configured to carry out the functions 432, 434, 436, 438 of the device 400. The circuitry 410 may include a processor 412, such as a central processing unit (CPU), microcontroller, or microprocessor. The processor 412 is configured to execute program code. The program code may for example be configured to carry out the functions 432, 434, 436, 438 of the device 400.

The device 400 may further comprise a memory 430. The memory 430 may be one or more of a buffer, a flash memory, a hard drive, a removable media, a volatile memory, a non-volatile memory, a random access memory (RAM), or another suitable device. In a typical arrangement, the memory 430 may include a non-volatile memory for long term data storage and a volatile memory that functions as system memory for the circuitry 410. The memory 430 may exchange data with the circuitry 410 over a data bus. Accompanying control lines and an address bus between the memory 430 and the circuitry 410 also may be present.

The functions 432, 434, 436, 438 of the device 400 may be embodied in the form of executable logic routines (e.g., lines of code, software programs, etc.) that are stored on a non-transitory computer readable medium (memory) 430 of the device 400 and are executed by the circuitry 410, e.g., using the processor 412 in the circuitry 410. Furthermore, the functions 432, 434, 436, 438 of the device 400 may be a stand-alone software application or form a part of a software application. The described functions may be considered a method that a processing unit, e.g., the processor 412 of the circuitry 410 is configured to carry out. Also, while the described functions 432, 434, 436, 438 may be implemented in software, such functionality may as well be carried out via dedicated hardware or firmware, or some combination of hardware, firmware and/or software.

The circuitry 410 is configured to execute an image overlap size determining function 432 configured to determine an image overlap size indicating a size of the overlapping region of the first image and the second image.

The circuitry 410 is further configured to execute a candidate area overlap ratio determining function 434 configured to determine a candidate area overlap ratio indicating an overlap between the first candidate area and the second candidate area The circuitry 410 is further configured to execute a merging threshold determining function 436 configured to determine a merging threshold based on the image overlap size.

The circuitry 410 is further configured to execute a merging function 438 configured to, on condition that the candidate area overlap ratio is larger than the merging threshold, merge the first candidate area and the second candidate area, thereby forming a merged candidate area.

The device 400 and the functions 432, 434, 436, 438 carried out by the circuitry 410 may be further adapted as the method 300 and the corresponding steps of the method 300 described in relation to FIG. 3, respectively.

A person skilled in the art realizes that the present concepts are not limited to the embodiments described above. On the contrary, many modifications and variations are possible within the scope of the appended claims. Such modifications and variations can be understood and effected by a skilled person in practicing the concepts, from a study of the drawings, the disclosure, and the appended claims.

The invention claimed is:

1. A method for merging a first candidate area relating to a candidate feature in a first image and a second candidate area relating to a candidate feature in a second image, wherein the first image and the second image have an overlapping region, and wherein at least a portion of the first candidate area and at least a portion of the second candidate area are located in the overlapping region, the method comprising:

determining an image overlap size indicating a size of the overlapping region of the first image and the second image;

determining a candidate area overlap ratio indicating a ratio of overlap between the first candidate area and the second candidate area;

determining a merging threshold based on the image overlap size; and on condition that the candidate area overlap ratio is larger than the merging threshold, merging the first candidate area and the second candidate area, thereby forming a merged candidate area.

2. The method according to claim 1, wherein the merging threshold is determined to be proportional to the image overlap size.

3. The method according to claim 1, wherein the candidate area overlap ratio is determined as the intersection of the first candidate area and the second candidate area divided by the union of the first candidate area and the second candidate area.

4. The method according to claim 1, wherein the first candidate area and the second candidate area are identified in coordinates of a combined image comprising the first image and the second image.

5. The method according to claim 1, wherein the first image is a first transformed view of a first portion of a fisheye image and the second image is a second transformed view of a second portion of the fisheye image, and wherein the first candidate area and the second candidate area are identified in coordinates of the fisheye image.

6. The method according to claim 1, wherein the merged candidate area consists of the union of the first candidate area and the second candidate area.

7. The method according to claim 1, wherein the first and second candidate areas are one of bounding boxes, pixel masks, and polygon areas.

8. A non-transitory computer readable storage medium having stored thereon instructions for implementing a method, when executed on a device having processing capabilities, the method for merging a first candidate area relating to a candidate feature in a first image and a second candidate area relating to a candidate feature in a second image, wherein the first image and the second image have an overlapping region, and wherein at least a portion of the first candidate area and at least a portion of the second candidate area are located in the overlapping region, the method comprising:

determining an image overlap size indicating a size of the overlapping region of the first image and the second image;

determining a candidate area overlap ratio indicating a ratio of overlap between the first candidate area and the second candidate area;

determining a merging threshold based on the image overlap size; and on condition that the candidate area overlap ratio is larger than the merging threshold, merging the first candidate area and the second candidate area, thereby forming a merged candidate area.

9. The non-transitory computer readable storage medium method according to claim 8, wherein the merging threshold is determined to be proportional to the image overlap size.

10. The non-transitory computer readable storage medium method according to claim 8, wherein the candidate area overlap ratio is determined as the intersection of the first candidate area and the second candidate area divided by the union of the first candidate area and the second candidate area.

11. The non-transitory computer readable storage medium method according to claim 8, wherein the first candidate area and the second candidate area are identified in coordinates of a combined image comprising the first image and the second image.

12. The non-transitory computer readable storage medium method according to claim 8, wherein the first image is a first transformed view of a first portion of a fisheye image and the second image is a second transformed view of a second portion of the fisheye image, and wherein the first candidate area and the second candidate area are identified in coordinates of the fisheye image.

13. The non-transitory computer readable storage medium method according to claim 8, wherein the merged candidate area consists of the union of the first candidate area and the second candidate area.

14. A device for merging a first candidate area relating to a candidate feature in a first image and a second candidate area relating to a candidate feature in a second image, wherein the first image and the second image have an overlapping region, and wherein at least a portion of the first candidate area and at least a portion of the second candidate area are located in the overlapping region, the device comprising:

circuitry configured to execute:
an image overlap size determining function configured to determine an image overlap size indicating a size of the overlapping region of the first image and the second image;

a candidate area overlap ratio determining function configured to determine a candidate area overlap ratio indicating an overlap between the first candidate area and the second candidate area;

a merging threshold determining function configured to determine a merging threshold based on the image overlap size; and a merging function configured to, on condition that the candidate area overlap ratio is larger than the merging threshold, merge the first candidate area and the second candidate area, thereby forming a merged candidate area.

15. The device according to claim 14, wherein the merging threshold determining function is configured to determine merging threshold to be proportional to the image overlap size.

16. The device according to claim 14, wherein the candidate area overlap ratio determining function is configured to determine the candidate area overlap ratio as the intersection of the first candidate area and the second candidate area divided by the union of the first candidate area and the second candidate area.

17. The device according to claim 14, wherein the first candidate area and second candidate area are identified in coordinates of a combined image comprising the first image and the second image.

18. The device according to claim 14, wherein the first image is a first transformed view of a first portion of a fisheye image and the second image is a second transformed view of a second portion of the fisheye image, and wherein the first candidate area and second candidate area are identified in coordinates of the fisheye image.

19. The device according to claim 14, wherein the merged candidate area consists of the union of the first candidate area and the second candidate area.

20. The device according to claim 9, wherein the first and second candidate areas are one of bounding boxes, pixel masks, and polygon areas.

\* \* \* \* \*